United States Patent
Hogg et al.

(10) Patent No.: US 7,804,657 B1
(45) Date of Patent: Sep. 28, 2010

(54) SETTING AN OPERATING BIAS CURRENT FOR A MAGNETORESISTIVE HEAD USING RATIO OF TARGET VOLTAGE AND MEASURED VOLTAGE

(75) Inventors: Dennis W. Hogg, Laguna Hills, CA (US); Jonas A. Goode, Lake Forest, CA (US); Tuyen V. Trinh, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 438 days.

(21) Appl. No.: 11/761,224

(22) Filed: Jun. 11, 2007

(51) Int. Cl.
  *G11B 5/03* (2006.01)
(52) U.S. Cl. ...................................................... 360/66
(58) Field of Classification Search .................. 360/66, 360/46, 67, 68, 313, 31
  See application file for complete search history.

(56) References Cited

U.S. PATENT DOCUMENTS

| | | | |
|---|---|---|---|
| 4,914,398 A | 4/1990 | Jove et al. | |
| 5,283,521 A | 2/1994 | Ottesen et al. | |
| 5,412,518 A | 5/1995 | Christner et al. | |
| 5,418,660 A | 5/1995 | Sato et al. | |
| 5,420,513 A | 5/1995 | Kimura | |
| 5,790,334 A * | 8/1998 | Cunningham | 360/66 |
| 5,978,163 A | 11/1999 | Cunningham | |
| 6,111,715 A | 8/2000 | Tsuchiya et al. | |
| 6,115,201 A | 9/2000 | Enarson et al. | |
| 6,151,177 A | 11/2000 | Shrinkle et al. | |
| 6,195,219 B1 | 2/2001 | Smith | |
| 6,262,572 B1 | 7/2001 | Franco et al. | |
| 6,262,858 B1 | 7/2001 | Sugiyama et al. | |
| 6,288,863 B1 | 9/2001 | Flinsbaugh | |
| 6,320,713 B1 | 11/2001 | Tretter et al. | |
| 6,341,046 B1 | 1/2002 | Peterson | |
| 6,452,735 B1 | 9/2002 | Egan et al. | |
| 6,473,257 B1 | 10/2002 | Shimazawa et al. | |
| 6,483,676 B2 | 11/2002 | Nakatani | |
| 6,512,647 B1 | 1/2003 | Quak et al. | |
| 6,512,648 B1 | 1/2003 | Tsuchiya et al. | |
| 6,574,061 B1 | 6/2003 | Ling et al. | |
| 6,603,340 B2 * | 8/2003 | Tachimori | 327/262 |
| 6,654,191 B2 | 11/2003 | Ottesen et al. | |
| 6,731,448 B2 | 5/2004 | Briskin et al. | |
| 6,751,039 B1 | 6/2004 | Cheng et al. | |
| 6,762,914 B2 | 7/2004 | Fox et al. | |
| 6,801,376 B2 | 10/2004 | Smith | |
| 7,097,110 B2 | 8/2006 | Sheperek et al. | |
| 7,130,143 B1 * | 10/2006 | Tretter | 360/66 |
| 7,265,577 B2 * | 9/2007 | Madurawe | 326/38 |
| 7,480,115 B2 | 1/2009 | Hiroyuki et al. | |
| 2003/0169528 A1 | 9/2003 | Lim et al. | |
| 2007/0297819 A1 * | 12/2007 | Hagiwara et al. | 399/44 |
| 2008/0100948 A1 * | 5/2008 | Tretter | 360/66 |

* cited by examiner

OTHER PUBLICATIONS

Office Action dated Aug. 26, 2009 from U.S. Appl. No. 11/761,266, 8 pages.

*Primary Examiner*—Fred Tzeng
(74) *Attorney, Agent, or Firm*—Howard H. Sheerin, Esq.

(57) ABSTRACT

A method is disclosed for setting an operating bias current for a magnetoresistive (MR) element. A bias current is applied to the MR element, and a voltage across the MR element is measured corresponding to the bias current. The bias current is then adjusted in response to the bias current multiplied by a ratio of a target voltage and the measured voltage. The adjusted bias current is then applied to the MR element. In one embodiment, the bias current is adjusted until the measured voltage substantially equals the target voltage.

28 Claims, 6 Drawing Sheets

SETTING AN OPERATING BIAS CURRENT FOR A MAGNETORESISTIVE HEAD USING RATIO OF TARGET VOLTAGE AND MEASURED VOLTAGE

RELATED APPLICATIONS

This application is related to co-pending U.S. patent application titled "SETTING AN OPERATING BIAS CURRENT FOR A MAGNETORESISTIVE HEAD BY COMPUTING A TARGET OPERATING VOLTAGE", Ser. No. 11/761,266, filed on the same day as the present application and incorporated herein by reference.

BACKGROUND

1. Field

The present invention relates to magnetoresistive heads. In particular, the present invention relates to setting an operating bias current for a magnetoresistive head.

2. Description of the Related Art

Magnetoresistive (MR) heads are typically employed in data storage devices, such as magnetic tape drives and disk drives, for transducing the magnetic transitions recorded on a magnetic medium into a read signal that is demodulated by a read channel. A MR head comprises an MR element having a resistance that varies in response to the magnetic field emanating from the recording medium. The read signal may be generated by applying a constant bias voltage to the MR element and measuring the change in current flowing through the MR element as the resistance varies. Alternatively, the read signal may be generated by applying a constant bias current to the MR element and measuring the change in voltage across the MR element as the resistance varies.

Increasing the bias of the MR element typically increases the quality of the read signal (increases signal-to-noise); however, setting the bias too high reduces the lifetime of the MR element. The prior art has suggested to select a nominal voltage to operate the MR element (taking into account tolerances) to ensure longevity. By estimating the resistance of the MR element, the bias current can be set to achieve the nominal voltage. Certain MR elements, such as tunneling MR elements, exhibit a negative voltage coefficient of resistance resulting in a non-linear voltage drop at higher current densities as illustrated in FIG. 1. Consequently, the error in estimating the resistance according to a linear transfer function (e.g., using two point extrapolation) induces error in computing the optimal operating bias current.

An MR element may also exhibit a negative temperature coefficient of resistance meaning that the resistance of the MR element varies inversely with ambient temperature. It therefore may be necessary to re-estimate the resistance of the MR element as the ambient temperature changes so that the operating bias current can be adjusted accordingly. If the storage device employing the MR element operates with a limited bandwidth, the speed of the algorithm for re-estimating the resistance may impact performance.

There is, therefore, a need to accurately estimate the resistance of an MR element in order to accurately estimate an optimal operating bias current. There may also be a need to quickly re-estimate the resistance of the MR element to compensate for temperature variations.

SUMMARY OF THE EMBODIMENTS OF THE INVENTION

An embodiment of the present invention comprises a method of setting an operating bias current for a magnetoresistive (MR) element. A bias current is applied to the MR element, and a voltage across the MR element is measured corresponding to the bias current. The bias current is then adjusted in response to the bias current multiplied by a ratio of a target voltage and the measured voltage. The adjusted bias current is then applied to the MR element.

In one embodiment, the bias current is selected as the target voltage divided by a typical maximum resistance value for the MR element. In another embodiment, the bias current is selected as the target voltage divided by a resistance estimate for the MR element.

In another embodiment, adjusting the bias current comprises multiplying the bias current by the target voltage divided by the measured voltage.

In yet another embodiment, the method further comprises measuring the voltage across the MR element corresponding to the adjusted bias current. In one embodiment, the method further comprises determining whether the voltage measured across the MR element substantially equals the target voltage, and in one embodiment, the bias current is adjusted until the voltage measured across the MR element substantially equals the target voltage.

In still another embodiment, the method further comprises computing a resistance estimate for the MR element in response to the bias current and the voltage measured across the MR element, and adjusting the target voltage in response to the resistance estimate.

In another embodiment, the method further comprises measuring an ambient temperature of the MR element, wherein the target voltage is adjusted in response to the ambient temperature.

In still another embodiment, the target voltage is a nominal voltage.

In another embodiment, the MR element is heated according to a heating power to adjust a fly-height of the MR element, and the target voltage is adjusted according to:

$$b_0 + (b_1 \cdot R) + (b_2 \cdot W) + (b_3 \cdot R \cdot W) + (b_4 \cdot Ftemp) + (b_5 \cdot Ftemp \cdot R)$$

where:
R is a resistance estimate for the MR element;
Ftemp is an ambient temperature of the MR element;
W is the heating power; and
$b_0$-$b_5$ are coefficients.

Another embodiment of the present invention comprises a disk drive including a disk, a head actuated over the disk, the head comprising a magnetoresistive (MR) element, and control circuitry operable to set an operating bias current for the MR element. A bias current is applied to the MR element, and a voltage across the MR element is measured corresponding to the bias current. The bias current is then adjusted in response to the bias current multiplied by a ratio of a target voltage and the measured voltage. The adjusted bias current is then applied to the MR element.

DETAILED DESCRIPTION OF EMBODIMENTS OF THE INVENTION

Figure 2:
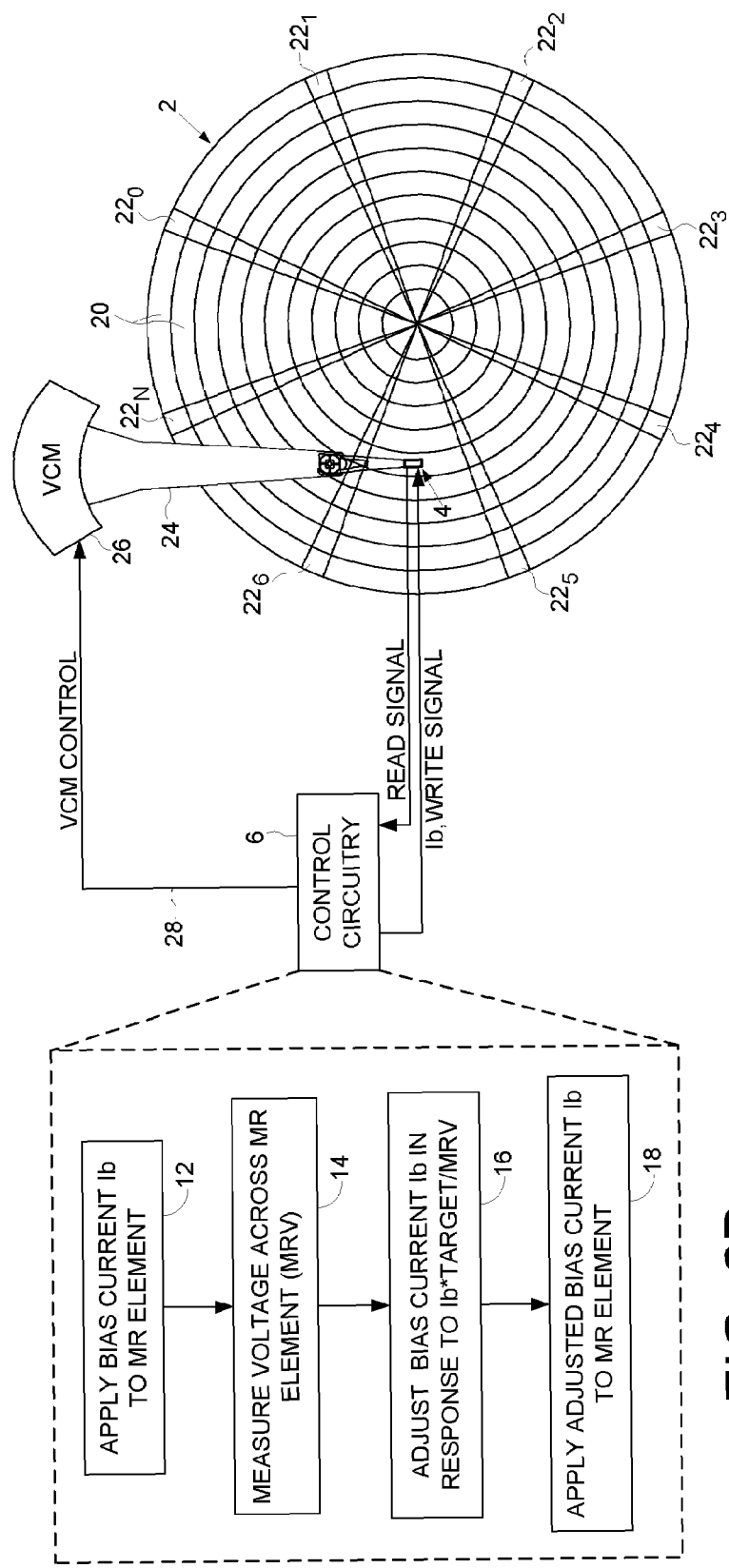
FIG. 2A shows a disk drive according to an embodiment of the present invention comprising a disk, a head actuated over the disk, the head comprising an MR element, and control circuitry.
FIG. 2B is a flow diagram executed by the control circuitry of FIG. 2A to adjust an operating bias current for the MR element by multiplying the bias current by a ratio of a target voltage and a measured voltage across the MR element.

FIG. 2A shows a disk drive according to an embodiment of the present invention including a disk 2, a head 4 actuated over the disk 2, the head 4 comprising a magnetoresistive (MR) element, and control circuitry 6 operable to set an operating bias current for the MR element. FIG. 2B is a flow diagram according to an embodiment of the present invention executed by the control circuitry 6. A bias current is applied to the MR element at step 12, and at step 14 a voltage across the MR element is measured corresponding to the bias current. At step 16 the bias current is adjusted in response to the bias current multiplied by a ratio of a target voltage and the measured voltage. The adjusted bias current is then applied to the MR element at step 18.

In the embodiment of FIG. 2A, the disk 2 comprises a plurality of radially spaced, concentric tracks 20 defined by embedded servo sectors $22_0$-$22_N$. The head 4 is attached to a distal end of an actuator arm 24 which is rotated about a pivot by a voice coil motor (VCM) 26 in order to access a selected track. The control circuitry 6 processes the read signal emanating from the head 4 to demodulate the embedded servo sectors $22_0$-$22_N$ into a position error signal (PES) representing the radial location of the head 4 relative to a target location. The PES is converted into a control signal 28 (e.g., using appropriate compensation filtering) which is applied to the VCM 26 in order to servo the head 4. During a write operation, the control circuitry 6 applies a write signal to the head 4 in order to record a sequence of magnetic transitions onto the disk surface representing the recorded data. During read operations, the control circuitry 6 applies a bias current to the MR element and measures the change in voltage across the MR element (or the change in current flowing through the MR element) as it passes over the magnetic transitions. This read signal is then demodulated by the control circuitry 6 into an estimated data sequence representing the recorded data. The control circuitry 6 may send/receive other signals to/from the head 4 or other portions of the disk drive, such as ambient temperature, heating power, etc., as will be described below.

In order to extend the life of the MR element, a bias current is selected corresponding to a target voltage that ensures the MR element is not overstressed. For example, in one embodiment the target voltage is selected as the nominal voltage (taking into account tolerances) that provides acceptable performance while avoiding degradation. The nominal voltage may be determined in any suitable manner, such as using any well known testing techniques for determining time-to-failure of a typical MR element. For example, the nominal voltage may be determined by evaluating a number of MR elements during stress testing wherein the MR element is subject to extreme operating conditions, such as a high voltage and/or operating temperature.

Figure 3:
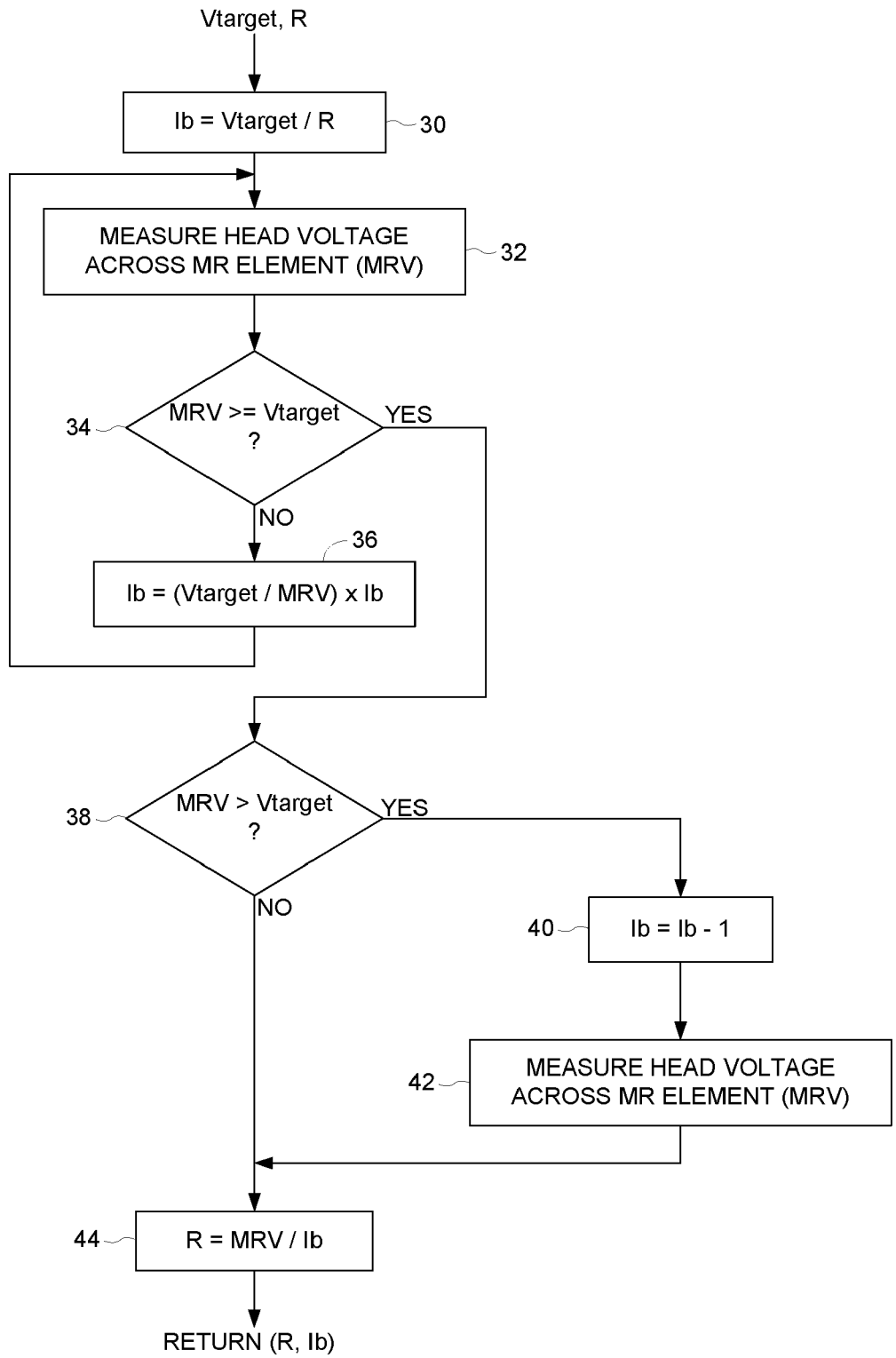
FIG. 3 is a more detailed flow diagram according to an embodiment of the present invention wherein the bias current is adjusted until the measured voltage substantially equals the target voltage.

After selecting a suitable nominal voltage as the target voltage, a corresponding bias current is then determined for each MR element (e.g., for each head in each individual disk drive). FIG. 3 shows a flow diagram that may be implemented by control circuitry 6 according to an embodiment of the present invention for setting the bias current corresponding to the target voltage. At step 30 the bias current (Ib) is initialized to the target voltage (nominal voltage in this embodiment) divided by a default resistance (e.g., a typical maximum resistance for the MR element). The bias current is applied to the MR element, and at step 32 the corresponding voltage across the MR element is measured. If at step 34 the measured voltage across the MR element does not substantially equal the target voltage, then at step 36 the bias current is increased by multiplying the bias current by the target voltage divided by the measured voltage. Steps 32 and 34 are repeated and the bias current increased until the measured voltage substantially equals the target voltage at step 36. If at step 38 the measured voltage is greater than the target voltage, then at step 40 the bias current is decremented to ensure the measured voltage does not exceed the target voltage. At step 42 the voltage across the MR element is measured, and at step 44 a resistance estimate is computed for the MR element as the measured voltage divided by the bias current. The bias current returned from the flow diagram of FIG. 3 is then used during normal operation of the MR element.

Figure 1:
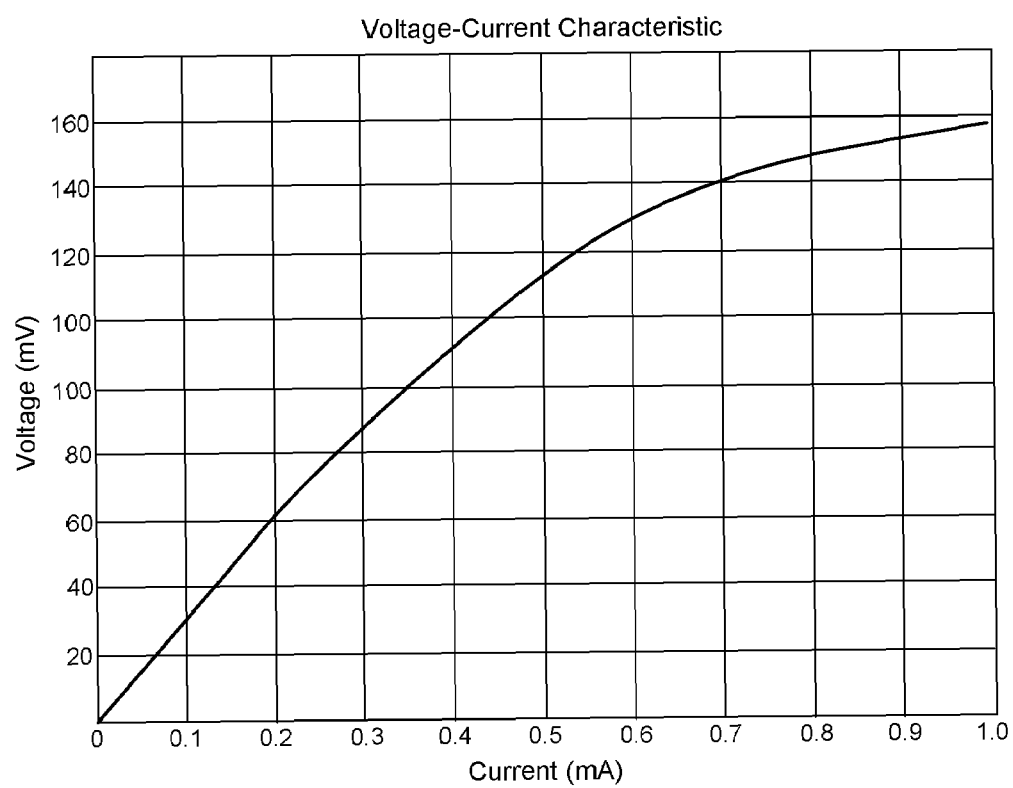
FIG. 1 illustrates a negative voltage coefficient of resistance resulting in a non-linear voltage drop at higher current densities for certain MR elements, such as tunneling MR elements.

The flow diagram of FIG. 3 determines the bias current that corresponds to the target voltage in a manner that accounts for a negative voltage coefficient of resistance resulting in a non-linear voltage drop at higher current densities as illustrated in FIG. 1. Rather than employ a linear transfer function that attempts to estimate the correct bias current setting to achieve the target voltage, the flow diagram of FIG. 3 adjusts the bias current until the voltage measured across the MR element actually equals (substantially) the target voltage which avoids the error associated with a linear transfer function. In addition, multiplying the bias current by a ratio of the target voltage and the measured voltage quickly converges to the correct value within only a few iterations.

Figure 4:
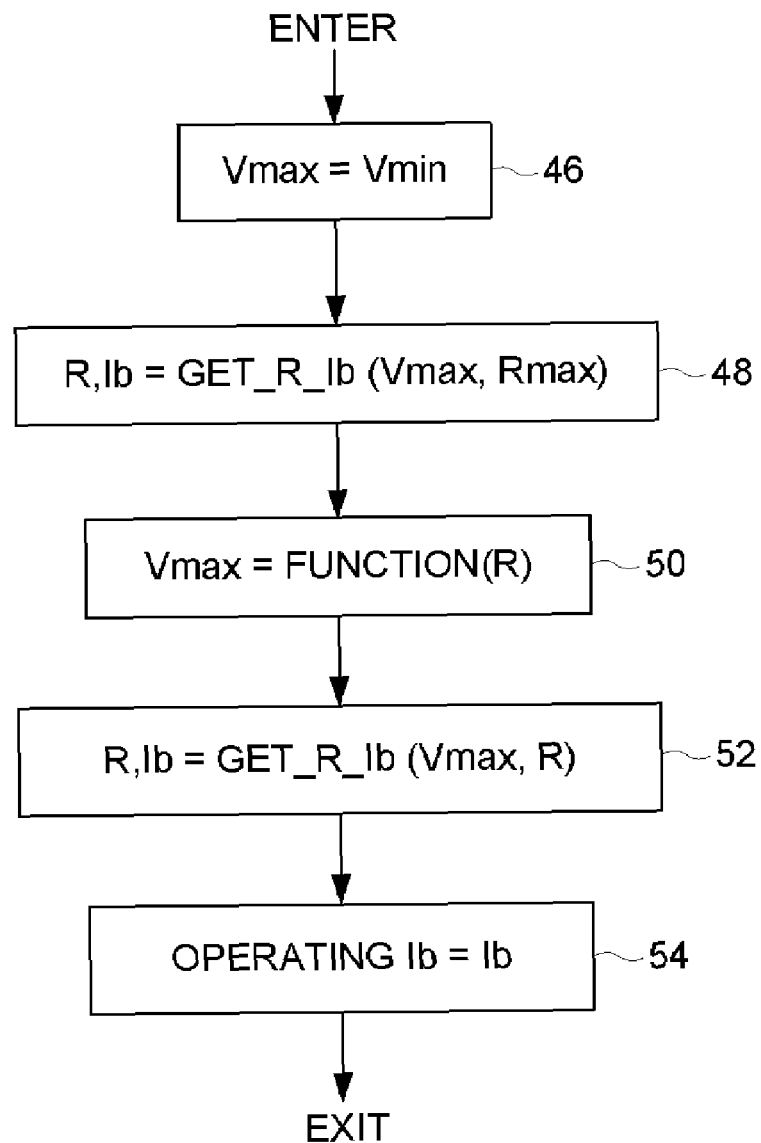
FIG. 4 is a flow diagram according to an embodiment of the present invention wherein a resistance of the MR element is estimated, and used to compute a target voltage for the MR element.

FIG. 4 is a flow diagram that may be implemented by control circuitry 6 according to an embodiment of the present invention wherein the target voltage of the MR element is adjusted in response to a resistance estimate for the MR element. At step 46 a maximum voltage Vmax across the MR element is initialized to a minimum value Vmin that is sufficiently less than the overstressing voltage to ensure the MR element is not damaged (taking tolerances into account). For example, referring to FIG. 1, if the threshold voltage that will overstress the MR element is 140 mV, the minimum voltage Vmin at step 46 of FIG. 4 may be selected at about 120 mV.

At step 48 the flow diagram of FIG. 3 is executed to determine the bias current that will generate a measured voltage across the MR element of Vmax. The initial resistance for the MR element is set to a typical maximum value Rmax to ensure the initial bias current applied at step 30 of FIG. 3 does not overstress the MR element. The flow diagram of FIG. 3 returns a resistance estimate R for the MR element which is used at step 50 of FIG. 4 to adjust the maximum voltage Vmax (which in this embodiment is the target voltage). At step 52 the flow diagram of FIG. 3 is executed again to determine the bias current that will generate a measured voltage across the MR element of the adjusted Vmax (the adjusted target voltage). The resistance value for selecting the initial bias current at step 30 of FIG. 3 is the resistance estimate determined at step 48 of FIG. 4. At step 54 the operating bias current for the MR element is set to the bias current returned by the flow diagram of FIG. 3.

The target voltage may be adjusted in response to any suitable parameter that affects the longevity of the MR element. In one embodiment, an ambient temperature of the MR element is measured and the target voltage is adjusted in response to the ambient temperature. In one embodiment, a single ambient temperature measurement is taken for the disk drive, and in an alternative embodiment, an ambient temperature measurement is taken for each head in the disk drive. In another embodiment, the MR element is heated to adjust a fly-height of the MR element, and the target voltage is adjusted in response to one or more characteristics of the heating process, such as the heating power, the heating voltage, and/or the heating current. In other embodiments, the target voltage may be adjusted in response to a write current applied to a write coil of the head, the magnitude of the bias current applied to the MR element, and/or a detected altitude of the MR element.

In addition, the target voltage may be adjusted using any suitable algorithm in response to the parameters that affect the longevity of the MR element. For example, in one embodiment the target voltage is adjusted according to:

$$b_0 + (b_1 \cdot R) + (b_2 \cdot W) + (b_3 \cdot R \cdot W) + (b_4 \cdot Ftemp) + (b_5 \cdot Ftemp \cdot R)$$

where:
  R is a resistance estimate for the MR element;
  Ftemp is an ambient temperature of the MR element;
  W is the heating power; and
  $b_0$-$b_5$ are coefficients.

In one embodiment, the coefficients $b_0$-$b_5$ are determined using any well known testing techniques for determining time-to-failure of a typical MR element. For example, a number of MR elements may be tested by adjusting the above parameters (ambient temperature, heating power, resistance) and determining the coefficients $b_0$-$b_5$ for the above equation that provides the best estimate of the maximum target voltage (from a lifetime perspective) using any suitable curve fitting technique.

In one embodiment, the coefficient $b_0$ in the above equation (which represents a DC offset for the target voltage) is adjusted to obtain an optimal target voltage that minimizes a bit error rate of the disk drive, as well as compensates for temperature changes. In one embodiment, a nominal temperature coefficient $b_{0\_nom}$ is determined as well as a hot temperature coefficient $b_{0\_hot}$. In one embodiment, the nominal and hot coefficients ($b_{0\_nom}$ and $b_{0\_hot}$) are determined for each production disk drive in a temperature controlled chamber during manufacturing. In an alternative embodiment, the nominal and hot coefficients ($b_{0\_nom}$ and $b_{0\_hot}$) are determined for a number of disk drives, and average coefficient values employed in each production disk drive to avoid having to calibrate the coefficients for each disk drive.

Figure 5:
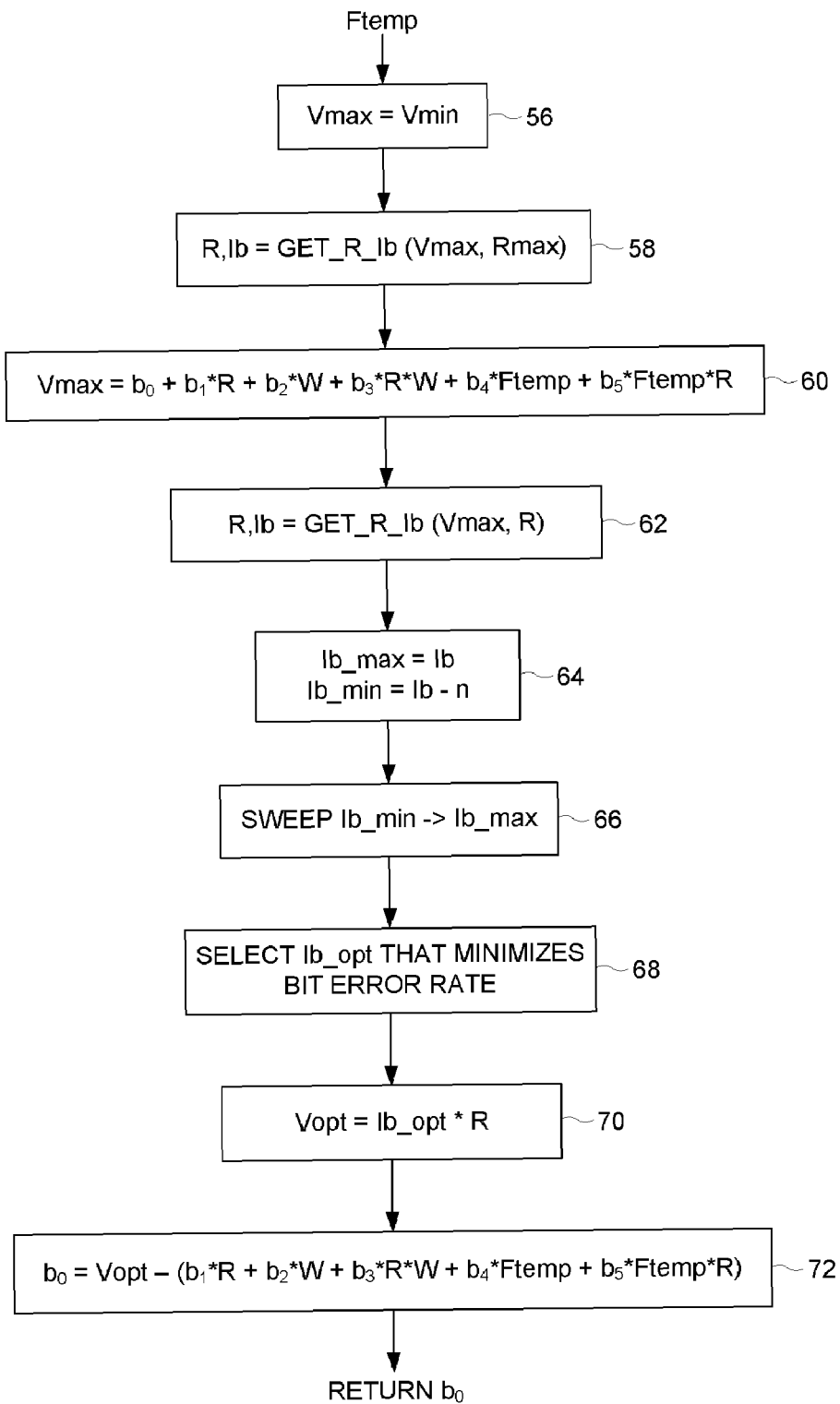
FIG. 5 is a flow diagram according to an embodiment of the present invention wherein an optimal target voltage is determined by sweeping the bias current from a minimum to a maximum and selecting the bias current that minimizes the bit error rate.

FIG. 5 is a flow diagram that may be implemented by control circuitry 6 according to an embodiment of the present invention wherein nominal and hot coefficients ($b_{0\_nom}$ and $b_{0\_hot}$) are determined for a nominal and hot temperature (Ftemp) as well as relative to a minimum bit error rate of the disk drive. The disk drive is first subject to a nominal temperature (Ftemp=nominal) and then at step 56 a maximum voltage Vmax is set to the minimal voltage similar to step 46 of FIG. 4 described above. At step 58 the flow diagram of FIG. 3 is executed to determine the bias current and resistance estimate for the MR element that corresponds to the maximum voltage Vmax. At step 60 the Vmax is adjusted using the above equation for the current parameter settings (resistance estimate R, temperature Ftemp, and heating power W) using a nominal value for coefficient $b_0$. At step 62 the flow diagram of FIG. 3 is executed to determine the bias current and resistance estimate that correspond to the adjusted Vmax. At step 66 the bias current is swept from a minimal value to a maximum value (Ib_max=Ib; Ib_min=Ib−n at step 64) and at step 68 an optimal bias current Ib_opt is selected that generated the minimum bit error rate for the disk drive. For example, in one embodiment the disk drive writes and reads a test pattern for each bias current setting, records the corresponding bit error rate, and selects the bias current that generated the minimum bit error rate. At step 70 an optimal voltage Vopt is computed as the optimal bias current Ib_opt multiplied by the resistance estimate R. At step 72 the nominal temperature coefficient $b_{0\_nom}$ is calculated using the above equation. The disk drive is then subject to a hot temperature and the flow diagram of FIG. 5 is re-executed to determine the hot temperature coefficient $b_{0\_hot}$.

Figure 6:
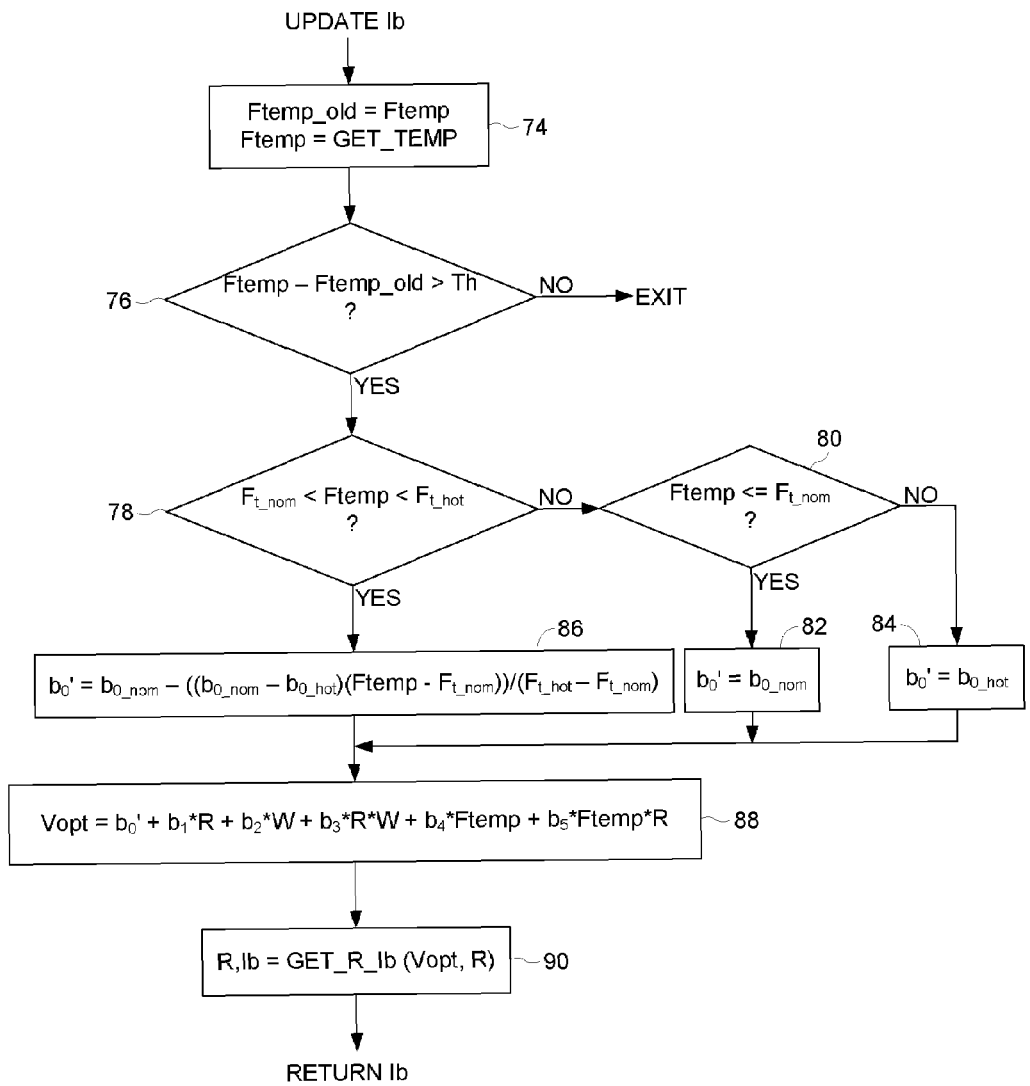
FIG. 6 is a flow diagram according to an embodiment of the present invention wherein the target voltage and corresponding bias current are adjusted when the ambient temperature changes.

The nominal and hot coefficients ($b_{0\_nom}$ and $b_{0\_hot}$) are saved and used during normal operation of the disk drive to adjust the bias current as the temperature changes. This embodiment is understood from the flow diagram of FIG. 6 that may be implemented by control circuitry 6, wherein at step 74 the previously measured temperature is saved and the current temperature measured. If at step 76 the difference between the previously measured temperature and the current temperature exceeds a threshold (i.e., the temperature change exceeds a threshold), then at step 78 the current temperature Ftemp is compared to the nominal temperature $F_{t\_nom}$ (corresponding to the nominal temperature coefficient $b_{0\_nom}$) and the hot temperature $F_{t\_hot}$ (corresponding to the hot temperature coefficient $b_{0\_hot}$). If at step 78 the current temperature Ftemp is not between $F_{t\_nom}$ and $F_{t\_hot}$, then if at step 80 the current temperature Ftemp is less than or equal to $F_{t\_nom}$, at step 82 the coefficient $b_0'$ is set to the nominal temperature coefficient $b_{0\_nom}$; otherwise, at step 84 the coefficient $b_0'$ is set to the hot temperature coefficient $b_{0\_hot}$. If at step 78 the current temperature Ftemp is between $F_{t\_nom}$ and $F_{t\_hot}$, then the coefficient $b_0'$ is computed as an appropriate function of the current temperature Ftemp, such as with the linear regression equation shown at step 86.

After determining the adjusted coefficient $b_0'$ corresponding to the current temperature Ftemp, at step 88 a corresponding optimal voltage Vopt is computed using the above equation. The flow diagram of FIG. 3 is then executed at step 90 to determine the bias current and resistance estimate for the MR element that correspond to the optimal voltage Vopt, wherein in one embodiment the resistance value R used as the input to the flow diagram of FIG. 3 is the previous resistance estimate for the MR element. The adjusted bias current is then used to operate the disk drive until the next temperature change exceeds the threshold at step 76.

Using an equation based technique for determining the target operating voltage for the MR element as a function of certain parameters (e.g., resistance, and/or temperature, etc.), and then determining the corresponding bias current (e.g., using the flow diagram of FIG. 3) avoids the complexity as well as potential inaccuracy of an equation that attempts to estimate the bias current directly as a function of the parameters (e.g., resistance, and/or temperature, etc.). In addition, adjusting a coefficient $b_0$ of the equation that represents a DC offset of the target operating voltage provides a convenient and extremely fast technique for adjusting the target operating voltage (and corresponding bias current) relative to temperature changes.

Any suitable control circuitry 6 may be employed in the embodiments of the present invention, such as any suitable integrated circuit or circuits. For example, the control circuitry 6 may be implemented within a read channel integrated circuit, or in a component separate from the read channel, such as a disk controller, or certain steps described above may be performed by a read channel and others by a disk controller.

In one embodiment, the read channel and disk controller are implemented as separate integrated circuits, and in an alternative embodiment they are fabricated into a single integrated circuit or "system on a chip" (SOC). In addition, the control circuitry may include a suitable preamp circuit implemented as a separate integrated circuit, integrated into the read channel or disk controller circuit, or integrated into an SOC, wherein the preamp circuit comprises suitable circuitry for generating and applying the bias current to the MR element and for measuring the voltage across the MR element.

In one embodiment, the control circuitry 6 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 6 comprises suitable logic circuitry, such as state machine circuitry.

Any suitable MR element may be employed in the embodiments of the present invention, including giant MR elements (GMR), spin-valve MR elements (SVMR), tunneling MR elements (TMR), and current-perpendicular-to-plane MR elements (CPPMR).

What is claimed is:

1. A method of setting an operating bias current for a magnetoresistive (MR) element, the method comprising:
   (a) applying a bias current to the MR element;
   (b) measuring a voltage across the MR element corresponding to the bias current;
   (c) adjusting the bias current in response to the bias current multiplied by a ratio of a target voltage and the measured voltage; and
   (d) applying the adjusted bias current to the MR element.

2. The method as recited in claim 1, wherein the bias current is selected as the target voltage divided by a typical maximum resistance value for the MR element.

3. The method as recited in claim 1, wherein the bias current is selected as the target voltage divided by a resistance estimate for the MR element.

4. The method as recited in claim 1, wherein adjusting the bias current comprises multiplying the bias current by the target voltage divided by the measured voltage.

5. The method as recited in claim 1, further comprising:
   (e) measuring the voltage across the MR element corresponding to the adjusted bias current.

6. The method as recited in claim 5, further comprising determining whether the voltage measured across the MR element substantially equals the target voltage.

7. The method as recited in claim 5, further comprising repeating elements (c) through (e) at least once.

8. The method as recited in claim 7, wherein elements (c) through (e) are repeated until the voltage measured across the MR element substantially equals the target voltage.

9. The method as recited in claim 5, further comprising:
   (f) computing a resistance estimate for the MR element in response to the bias current and the voltage measured across the MR element; and
   (g) adjusting the target voltage in response to the resistance estimate.

10. The method as recited in claim 5, further comprising measuring an ambient temperature of the MR element, wherein the target voltage is adjusted in response to the ambient temperature.

11. The method as recited in claim 1, wherein the target voltage is a nominal voltage.

12. The method as recited in claim 1, wherein the MR element is heated according to a heating power to adjust a fly-height of the MR element, and the target voltage is adjusted according to:

$$b_0+(b_1 \cdot R)+(b_2 \cdot W)+(b_3 \cdot R \cdot W)+(b_4 \cdot Ftemp)+(b_5 \cdot Ftemp \cdot R)$$

where:
   R is a resistance estimate for the MR element;
   Ftemp is an ambient temperature of the MR element;
   W is the heating power; and
   $b_0$-$b_5$ are coefficients.

13. A disk drive comprising:
   a disk;
   a head actuated over the disk, the head comprising a magnetoresistive (MR) element; and
   control circuitry operable to set an operating bias current for the MR element by:
   (a) applying a bias current to the MR element;
   (b) measuring a voltage across the MR element corresponding to the bias current;
   (c) adjusting the bias current in response to the bias current multiplied by a ratio of a target voltage and the measured voltage; and
   (d) applying the adjusted bias current to the MR element.

14. The disk drive as recited in claim 13, wherein the control circuitry is operable to select the bias current as the target voltage divided by a typical maximum resistance value for the MR element.

15. The disk drive as recited in claim 13, wherein the control circuitry is operable to select the bias current as the target voltage divided by a resistance estimate for the MR element.

16. The disk drive as recited in claim 13, the control circuitry is operable to adjust the bias current by multiplying the bias current by the target voltage divided by the measured voltage.

17. The disk drive as recited in claim 13, wherein the control circuitry is further operable to set the operating bias current for the MR element by:
   (e) measuring the voltage across the MR element corresponding to the adjusted bias current.

18. The disk drive as recited in claim 17, wherein the control circuitry is further operable to set the operating bias current for the MR element by determining whether the voltage across the MR element substantially equals the target voltage.

19. The disk drive as recited in claim 17, wherein the control circuitry is further operable to set the operating bias current for the MR element by repeating elements (c) through (e) at least once.

20. The disk drive as recited in claim 19, wherein the control circuitry is further operable to set the operating bias current for the MR element by repeating elements (c) through (e) until the voltage measured across the MR element substantially equals the target voltage.

21. The disk drive as recited in claim 17, wherein the control circuitry is further operable to set the operating bias current for the MR element by:
 (f) computing a resistance estimate for the MR element in response to the bias current and the voltage measured across the MR element; and
 (g) adjusting the target voltage in response to the resistance estimate.

22. The disk drive as recited in claim 17, wherein the control circuitry is further operable to set the operating bias current for the MR element by measuring an ambient temperature of the MR element, and adjusting the target voltage in response to the ambient temperature.

23. The disk drive as recited in claim 13, wherein the target voltage is a nominal voltage.

24. The disk drive as recited in claim 13, wherein the control circuitry is further operable to heat the MR element according to a heating power to adjust a fly-height of the MR element, wherein the control circuitry is further operable to set the operating bias current for the MR element by adjusting the target voltage according to:

$$b_0+(b_1\cdot R)+(b_2\cdot W)+(b_3\cdot R\cdot W)+(b_4\cdot Ftemp)+(b_5\cdot Ftemp\cdot R)$$

where:
 R is a resistance estimate for the MR element;
 Ftemp is an ambient temperature of the MR element;
 W is the heating power; and
 $b_0$-$b_5$ are coefficients.

25. A disk drive comprising:
 a disk;
 a head actuated over the disk, the head comprising a magnetoresistive (MR) element; and
 a means for setting an operating bias current for the MR element comprising:
 a means for applying a bias current to the MR element;
 a means for measuring a voltage across the MR element corresponding to the bias current;
 a means for adjusting the bias current in response to the bias current multiplied by a ratio of a target voltage and the measured voltage; and
 a means for determining when the measured voltage due to the adjusted bias current is substantially equal to the target voltage.

26. The disk drive as recited in claim 25, further comprising a means for selecting an optimal target voltage by sweeping the bias current from a minimum to a maximum.

27. The disk drive as recited in claim 26, wherein the bias current is selected based on a measured bit error rate.

28. The disk drive as recited in claim 25, further comprising a means for adjusting the target voltage and bias current according to a measured ambient temperature.

\* \* \* \* \*